United States Patent [19]

Scott

[11] Patent Number: 5,046,261
[45] Date of Patent: Sep. 10, 1991

[54] LEVELING DEVICE FOR LEVELING TOOLS AND WORKPIECES

[75] Inventor: Jimmie D. Scott, Cedar Rapids, Iowa

[73] Assignee: Kwik-Way Manufacturing Co., Marion, Iowa

[21] Appl. No.: 472,169

[22] Filed: Jan. 30, 1990

[51] Int. Cl.⁵ .............................................. G01C 9/06
[52] U.S. Cl. ....................................... 33/366; 33/334; 33/371; 33/391
[58] Field of Search ............... 33/366, 368, 370, 379, 33/389, 390, 391, 348, 353, 334, 371

[56] References Cited

U.S. PATENT DOCUMENTS

| | | | |
|---|---|---|---|
| 2,338,811 | 1/1944 | Hasbrook | 33/366 |
| 3,564,531 | 2/1971 | Burgin | 33/366 X |
| 3,869,806 | 3/1975 | Humphrey | 33/348 |
| 4,152,839 | 5/1979 | McDonald | 33/366 |
| 4,325,190 | 4/1982 | Duerst | 33/366 |
| 4,506,450 | 3/1985 | Fleming et al. | 33/366 |
| 4,516,329 | 5/1985 | Dilcox | 33/366 |
| 4,571,844 | 2/1986 | Komasaku et al. | 33/366 |
| 4,800,542 | 1/1989 | Franklin et al. | 33/366 |

FOREIGN PATENT DOCUMENTS 120627  1/1948  Sweden ................................ 33/366

*Primary Examiner*—Harry N. Haroian
*Attorney, Agent, or Firm*—Hill, Van Santen, Steadman & Simpson

[57] ABSTRACT

A leveling device for leveling tools and workpieces which has extending shafts at opposite ends with one shaft being adapted to be inserted into a tool so as to adjust and indicate whether it is level and the other shaft being adjusted to receive a drilling or grinding tool or a flat plate such that the surface of a workpiece can be leveled.

1 Claim, 3 Drawing Sheets

LEVELING DEVICE FOR LEVELING TOOLS AND WORKPIECES

BACKGROUND OF THE INVENTION

1. Field of the Invention

This invention relates in general to a leveling device and in particular to a novel tool which can be attached to a machine to adjust the output spindle to a level position and which can also be connected to a workpiece so as to adjust the workpiece to a level position for machining and drilling and other procedures.

2. Description of the Prior Art

The alignment of a workpiece with drilling, grinding and other tools is often times done by visually aligning the surface or bore of the workpiece to the tool. Such alignment is often inaccurate and results in excessive grinding and/or cutting.

SUMMARY OF THE INVENTION

The present invention provides a novel leveling device which is generally cylindrical-shaped and which has dowels or pins which extend from opposite ends such that the upper pin can be inserted into a grinding or cutting tool. The lower pin can be attached to a grinder or cutter and can be inserted into an opening or into the planar surface of a workpiece. The device is provided with a mercury switch which when level provides an open circuit, but which when tilted closes the circuit. Indicating lights are connected in circuit with the mercury switch so as to indicate that the device is tilted in one of two directions.

A second embodiment includes a pendulum and a fiber optic light indicating means so as to indicate when the pendulum is in the centered position.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 2:
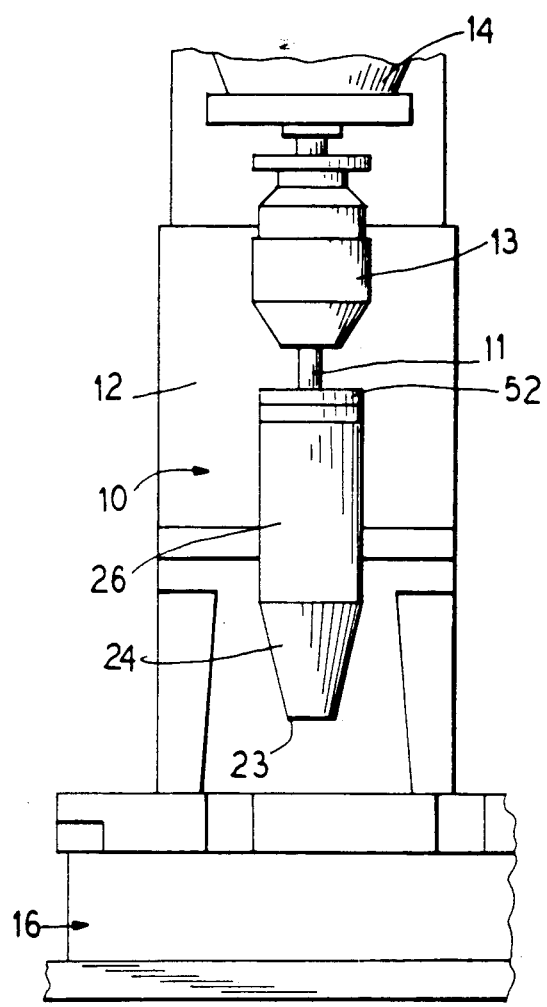
FIG. 2 is a front plan view of the invention mounted to a grinding or drilling tool spindle.
Figure 1:
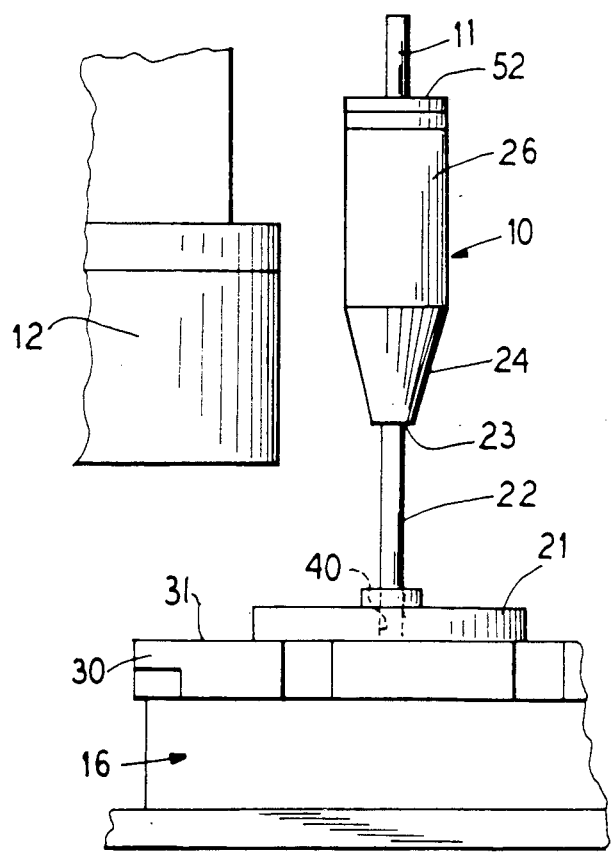
FIG. 1 is a front plan view of the invention mounted on a flat surface.
Figure 3:
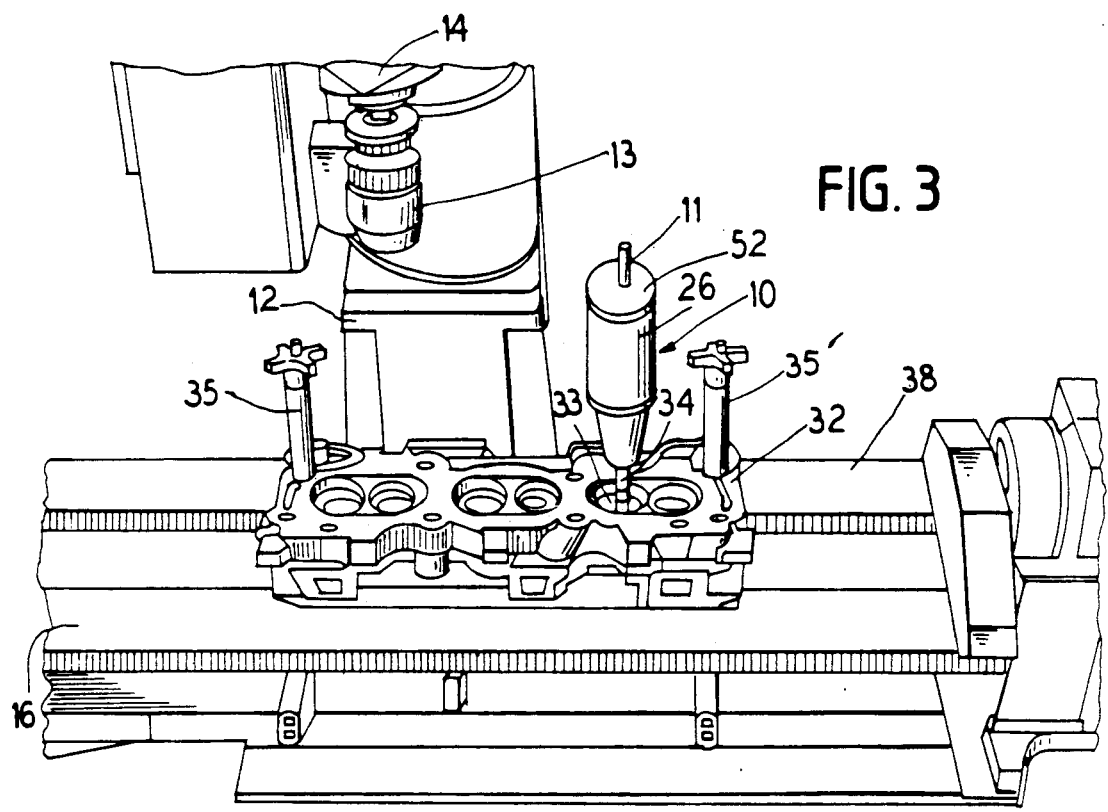
FIG. 3 is a perspective view of the invention mounted to a tool which fits within the bore of a workpiece.
Figure 4:
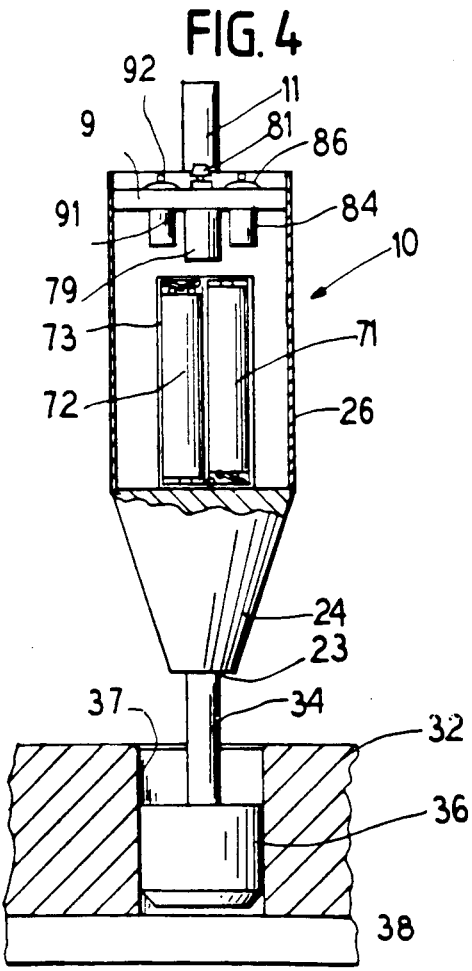
FIG. 4 is a sectional view of the invention illustrated in FIG. 3.

FIGS. 1-5 illustrate a first embodiment of the invention which comprises a quick level device 10 of generally cylindrical-shape which has a first extending dowel 11 from one end 52. The outer portion of the level 10 is surrounded by a cylindrical shell 26 which joins a conical portion 24 which has an end 23. A drill bushing 25 can be received in an opening in the end 23. As shown in FIG. 2, the leveling device 10 is used to assure alignment of a drill 13 mounted on a head 14 which extends from a base 16. FIG. 1 illustrates a workpiece 30 which has an upper surface 31 which is to be ground or otherwise machined. A flat plate 21 is formed with an opening 40 into which a pin 22 can be inserted. Pin 22 is also inserted into the opening in the end 23 of the leveling device 10. Thus, in the usage shown in FIG. 1, the leveling device 10 can be utilized to level an upper surface 31 of a workpiece 30. As shown in FIG. 3, the base 16 carries a workpiece 32 which is held by clamps 35 and 35' to the bed 38 of the base 16. A leveling device 10 is provided with a grinding tool 36 which has a stem 34 that can be received into the opening in the end 23 and the grinding tool 36 can be placed into the opening 33 of the workpiece 32 to grind it.

Figure 6:
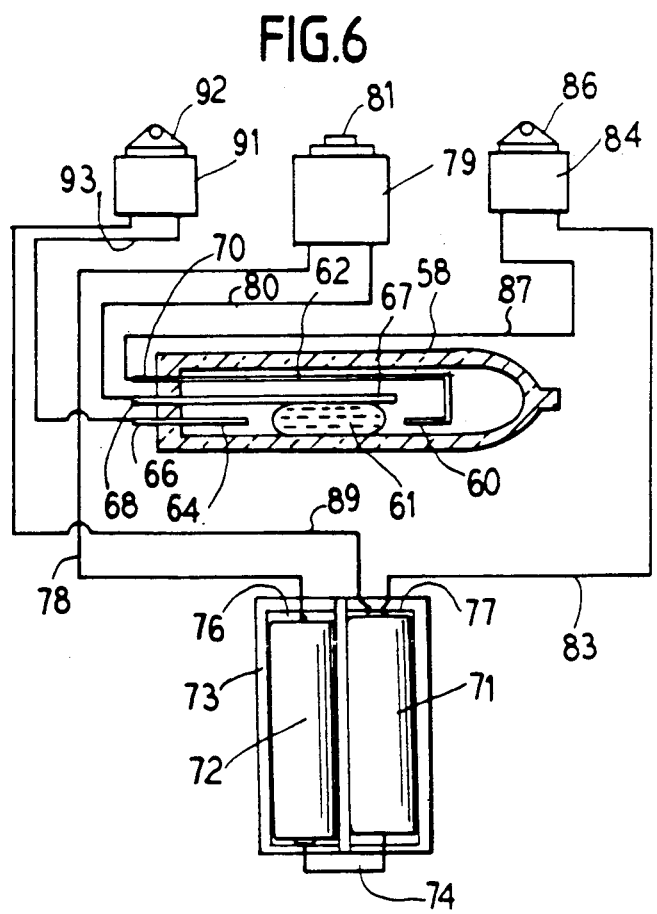
FIG. 6 illustrates the electrical circuit of the invention.
Figure 5:
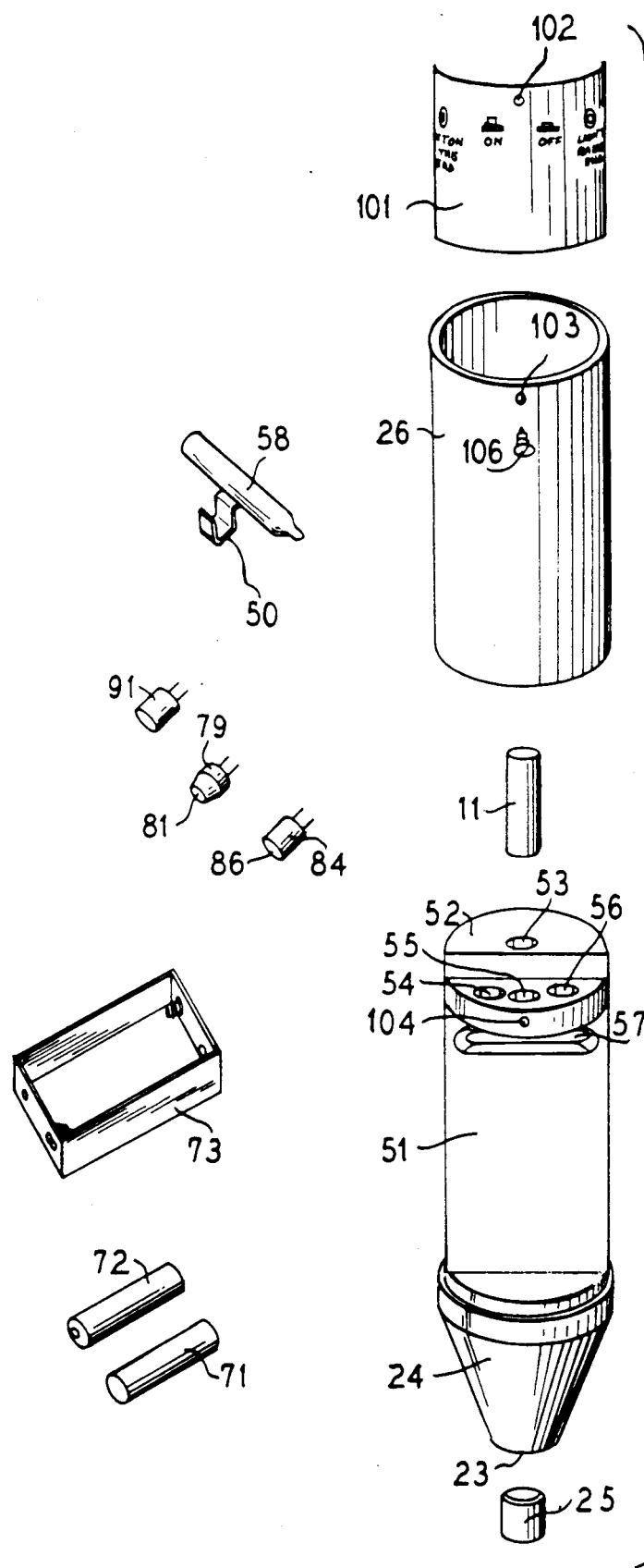
FIG. 5 is an exploded view of the invention.

Exploded view FIG. 5 illustrates the construction of the leveling device 10. A planar member 51 is formed with a horizontal opening 57. A mercury switch 58 is attached to a clamp 50 which can be received in the opening 57 to support the mercury switch 58. As is shown in the sectional view of FIG. 6, the mercury switch 58 includes three electrodes 64, 67 and 62 and a quantity of mercury 61. When the mercury switch 58 is level, the mercury 61 engages the center contact 67, but it does not engage either of the contacts 62 or 64. This condition is illustrated in FIG. 6. It is to be noted that the electrical contact 62 has a curved portion 60 which terminates adjacent the right end of the switch 58 as shown in FIG. 6. The contact 64 terminates adjacent the left end of the switch 58. Conical member 24 is attached to the planar member 51 and is formed with an opening 23 which is adaptable to receive different size drill bushings 25 therein, for example. An upper end 52 is formed with an opening 53 for receiving a dowel pin 11 therein and also has openings 54, 55 and 56 for respectively receiving therein an LED light 91 which has an end 92 which is received in opening 54, a push button switch 79 which has a push button 81 which is received in opening 55 and an LED light 84 which has an illuminated end 86 which is received in the opening 56. A battery holder 73 is attached to the member 51 and has contacts for receiving batteries 71 and 72 therein. A cylindrical cover member 26 fits over the member 51 and a set screw 106 passes through an opening 103 in the cylindrical member 26 and is received in an opening 104 in the end member 52. The screw 106 also passes through an opening 102 in an indicator plate 101.

FIG. 6 illustrates the electrical circuit for the leveling device. The batteries 71 and 72 are connected in series and a first lead 78 extends from switch 79 to one end 76 of the battery 72. A jumper 74 extends from the other end of the battery 72 to one end of the battery 71. A lead 83 extends from the end 77 of battery 71 to one contact of the LED 84 and a lead 87 extends from the other contact of the LED 84 to contact 70, 62, 60. A lead 89 extends from the end 77 of the battery 71 to one contact of LED 91 and a second lead 93 extends from the other contact of LED 91 to contact 66 which is connected to contact 64. The second side of the switch 81 is connected to electrical contact 67 by lead.

In operation, a leveling device 10 can be placed in the chuck 13 of a tool by extending the dowel 11 into the tool and tightening the chuck thereon. The switch 81 is closed and if the tool 13 is not vertical, the mercury 61 will move to one of the ends of the mercury switch 58 so as to make electrical contact between contact 64 and 67 for example. When this occurs, the LED 92 will be illuminated to indicate that the left side of the mercury switch 58 is low which indicates a non-level condition. The tool 13 is then leveled until the LED 92 turns off which means that the mercury 61 has moved out of engagement with the contact 64. If on the other hand the mercury 61 moves to engage the contact 60, the LED 86 will be illuminated to indicate that the right side is low and the tool will be adjusted until the mercury 61 is in the center out of engagement with the contacts 60 and 64. The leveling device 10 would then be rotated 90° and releveled so as to assure that the tool is vertical in both planes.

The planar surface 31 can also be leveled using the tool as illustrated in FIG. 1.

Figure 7:
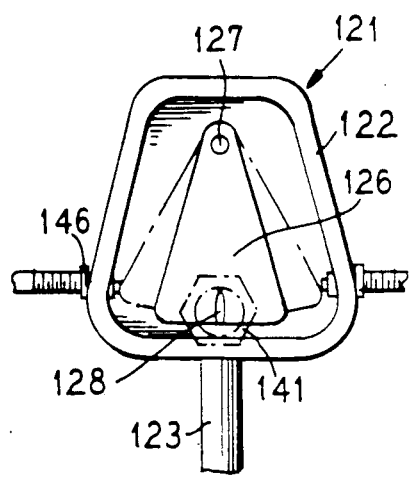
FIG. 7 illustrates a modification of the invention in sectional view.
Figure 8:
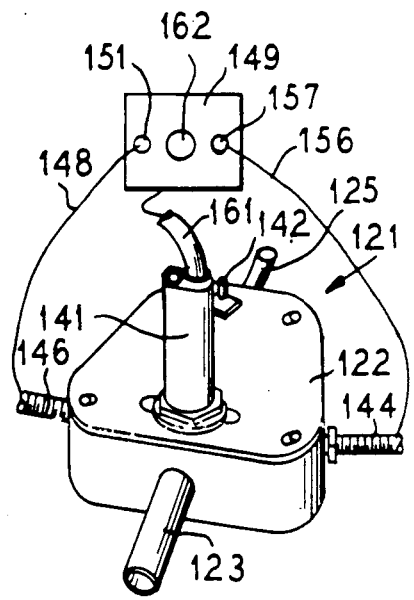
FIG. 8 is a perspective view of the modification illustrated in FIG. 7.

FIGS. 7 and 8 illustrate a modified form of the invention wherein outer case 122 supports a pendulum 126 on a pivot shaft 127. The pendulum 120 is formed with a central notch 128. A light and detector source 141 is connected to the case 122 and when turned on by an on-off switch 142 illuminates the pendulum such that if the slot 128 is centrally aligned then light will not be reflected to the detector. Magnetic switches 146 and 144 are connected to the case 122 so as to detect when the pendulum 126 moves from the center position toward the magnetic switches. The magnetic switch 146 is connected by a lead 148 to an indicator unit 149 which has a light 151 which is illuminated when the pendulum 126 is closely adjacent the magnetic switch 146. The magnetic switch 144 is connected by a lead 156 to the indicator unit 149 and to indicator light 157 so as to indicate when the pendulum 126 is closely adjacent the magnetic 144. A lead 161 is connected to an indicator light 162 in the indicator module 149 so as to indicate when the detector 141 indicates that the slot 128 is not centered relative to the detector 141. The dowel 125 and the dowel 123 allow the leveling device to be mounted in a manner similar to the leveling device 10 illustrated in FIGS. 1-5.

Although the invention has been described with respect to preferred embodiments, it is not to be so limited as changes and modifications can be made which are within the full intended scope of the invention as defined by the appended claims.

I claim as my invention:

1. A leveling device comprising a cylindrical-shaped body member, at least one reference shaft extending therefrom which is adapted to be received into an opening of a member which is to be leveled, a mercury switch mounted in said boy member, and an indicator connected to said mercury switch so as to indicate when said body member is level, wherein said mercury switch has first, second and third contacts and said indicator comprises two lights with one light connected to said second contract and said second light is connected to said third contact, wherein said mercury switch has first and second ends and said first contact has two ends with one of said ends of the first contact at said first end of said mercury switch and the other of said ends of the first contact at said second end of said mercury switch and said second contact is mounted in said first end and said third contact is mounted in said first end and extending adjacent said second end of said mercury switch, including metallic mercury in said mercury switch which is moveable in said switch between said first and second ends to make electrical contact between said first and second contacts and said first and third contacts and including a battery connected to said one and said second lights and to said first contact, said one reference shaft extending from said body member in a first direction and a second reference shaft extending from said body member in a second direction which is opposite to said first direction.

* * * * *